US012249451B2

(12) United States Patent
Nam et al.

(10) Patent No.: US 12,249,451 B2
(45) Date of Patent: Mar. 11, 2025

(54) MAGNETIC ELEMENT AND FLAT PANEL DISPLAY DEVICE COMPRISING SAME

(71) Applicant: LG INNOTEK CO., LTD., Seoul (KR)

(72) Inventors: Taek Hoon Nam, Seoul (KR); Yu Seon Kim, Seoul (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 683 days.

(21) Appl. No.: 17/616,240

(22) PCT Filed: May 22, 2020

(86) PCT No.: PCT/KR2020/006682
§ 371 (c)(1),
(2) Date: Dec. 3, 2021

(87) PCT Pub. No.: WO2020/246738
PCT Pub. Date: Dec. 10, 2020

(65) Prior Publication Data

US 2022/0254560 A1 Aug. 11, 2022

(30) Foreign Application Priority Data

Jun. 5, 2019 (KR) ........................ 10-2019-0066791

(51) Int. Cl.
*H01F 27/06* (2006.01)
*H01F 27/26* (2006.01)
*H01F 27/28* (2006.01)

(52) U.S. Cl.
CPC ........... *H01F 27/266* (2013.01); *H01F 27/06* (2013.01); *H01F 27/2823* (2013.01); *H01F 2027/065* (2013.01)

(58) Field of Classification Search
CPC .... H01F 27/266; H01F 27/06; H01F 27/2823; H01F 2027/065; H01F 27/306;
(Continued)

(56) References Cited

U.S. PATENT DOCUMENTS 4,347,490 A * 8/1982 Peterson ................ H01F 27/29
336/60
8,643,460 B2 2/2014 Tseng et al.
(Continued)

FOREIGN PATENT DOCUMENTS

JP 2015-230984 12/2015
KR 10-2011-0066792 6/2011
(Continued)

OTHER PUBLICATIONS

International Search Report dated Sep. 8, 2020 issued in Application No. PCT/KR2020/006682.

*Primary Examiner* — Tuyen T Nguyen
(74) *Attorney, Agent, or Firm* — KED & ASSOCIATES, LLP

(57) ABSTRACT

An inductor according to one embodiment of the present invention comprises: a core part; a coil part having one or more coils which are wound around the midfoot of the core part and which have two ends; and a base which is arranged beneath the coil part and which supports at least a part of the outer circumferential surface of each of the one or more coils, wherein the base can comprise: a frame having a hollow hole, which is formed at the center thereof so as to include a longer shaft and a shorter shaft; and a support part having a plurality of support members protruding toward the outer circumferential surface, so as to encompass at least a part of the outer circumferential surface.

9 Claims, 8 Drawing Sheets

(58) Field of Classification Search
CPC ........ H01F 27/325; H01F 17/04; H01F 27/24; H01F 27/28; H01F 27/30; H01F 3/00; G09F 9/37; G09F 9/375; H05K 1/18
See application file for complete search history.

(56) References Cited

U.S. PATENT DOCUMENTS

| | | | | |
|---|---|---|---|---|
| 2012/0001713 | A1* | 1/2012 | Park | H01F 27/325 336/192 |
| 2022/0277888 | A1* | 9/2022 | Kwon | H01F 27/24 |
| 2023/0104796 | A1* | 4/2023 | Bang | H01F 27/325 336/107 |

FOREIGN PATENT DOCUMENTS

| | | |
|---|---|---|
| KR | 10-2012-0007212 | 1/2012 |
| KR | 10-2012-0015814 | 2/2012 |
| KR | 10-1153521 | 6/2012 |
| KR | 10-2015-0144261 | 12/2015 |

* cited by examiner

【FIG. 1】
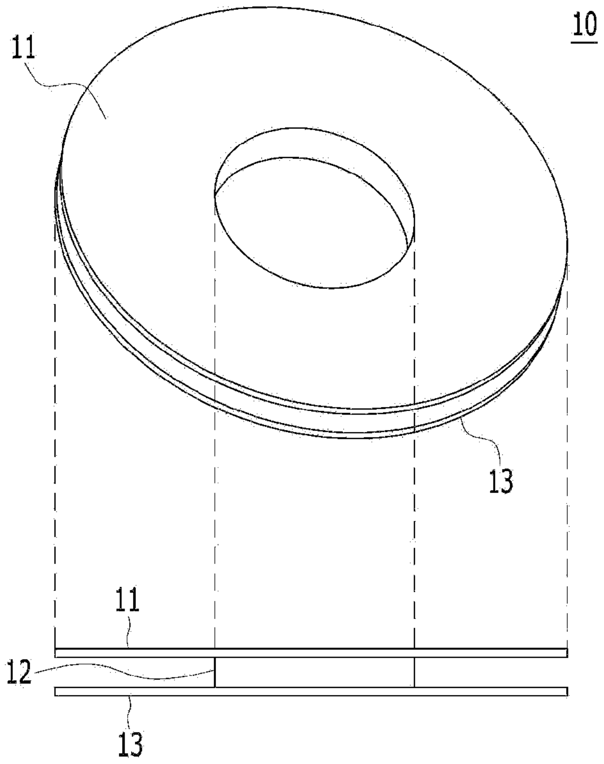

【FIG. 2A】
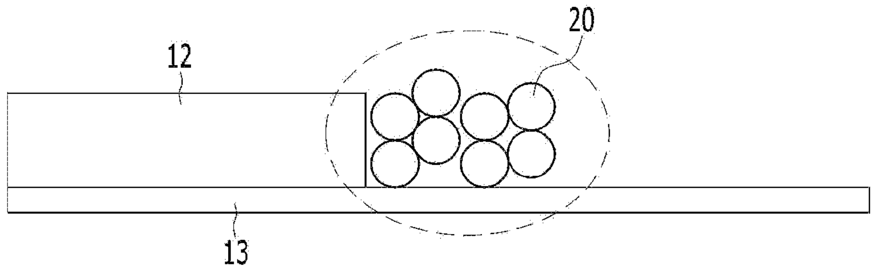
【FIG. 2B】
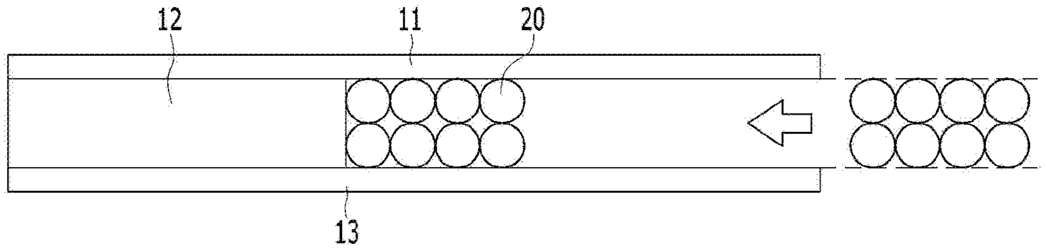

【FIG. 3】
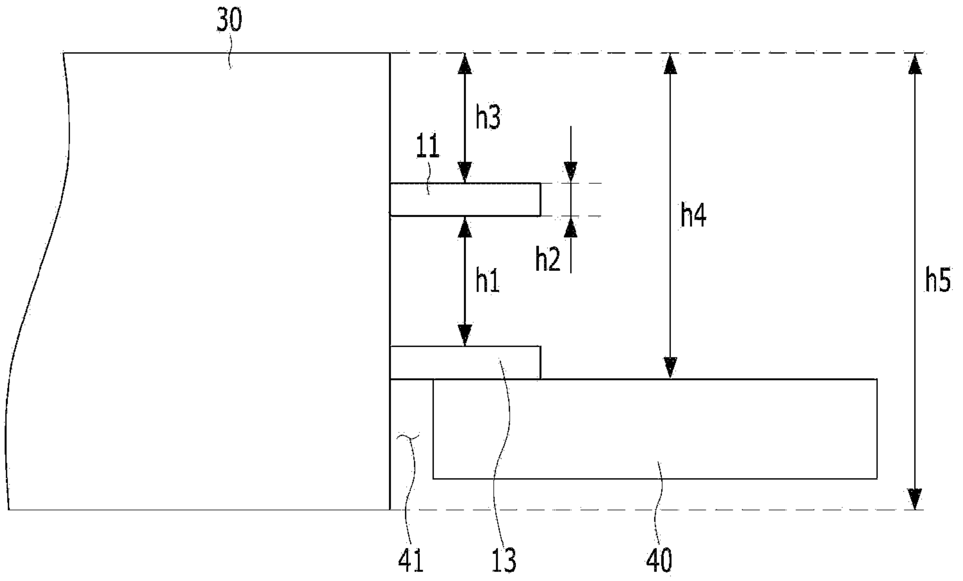
【FIG. 4】
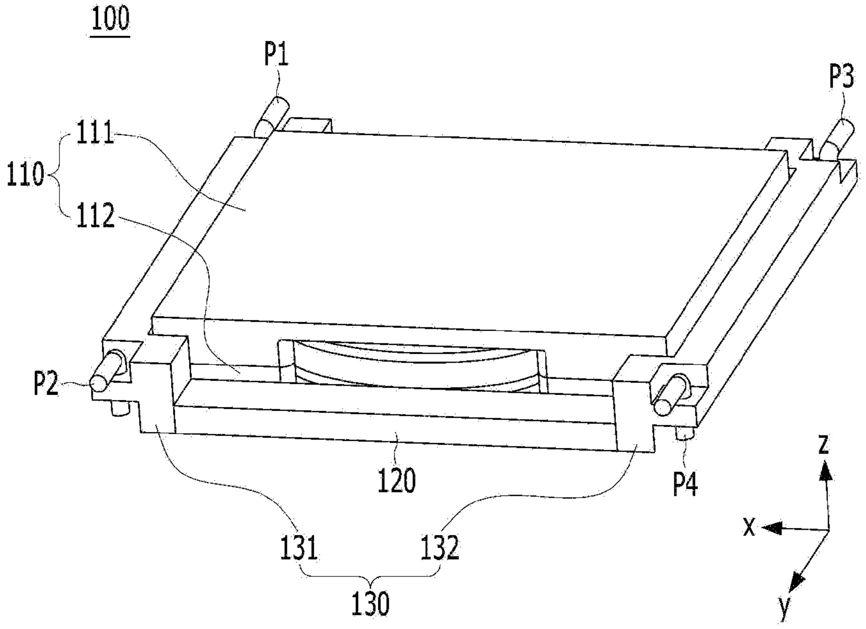

【FIG. 5】
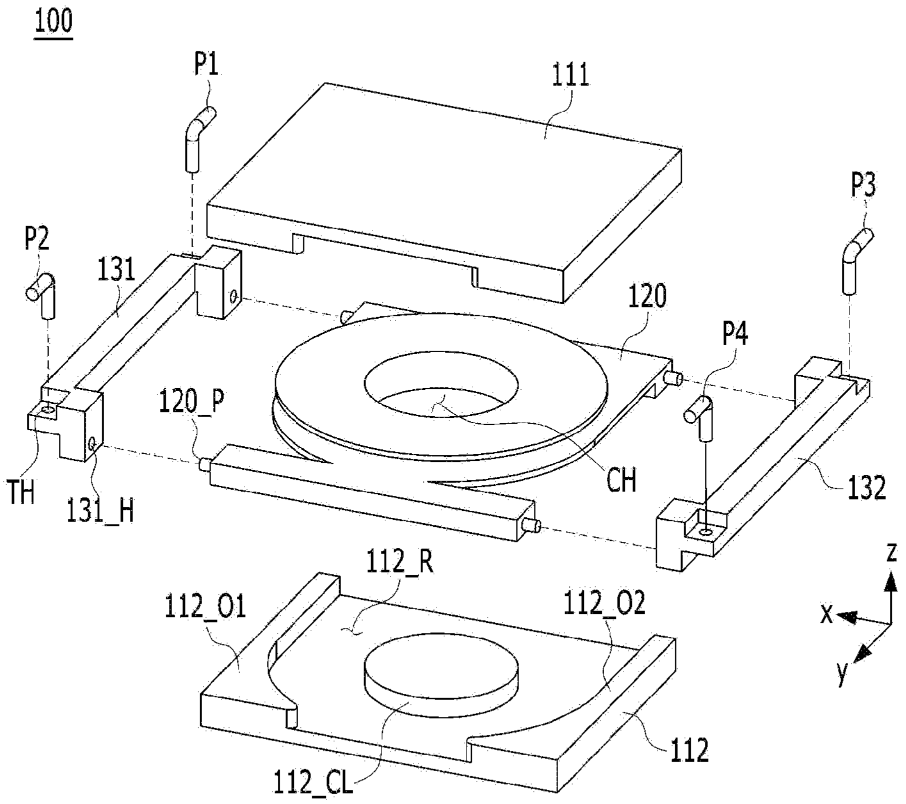

【FIG. 6】
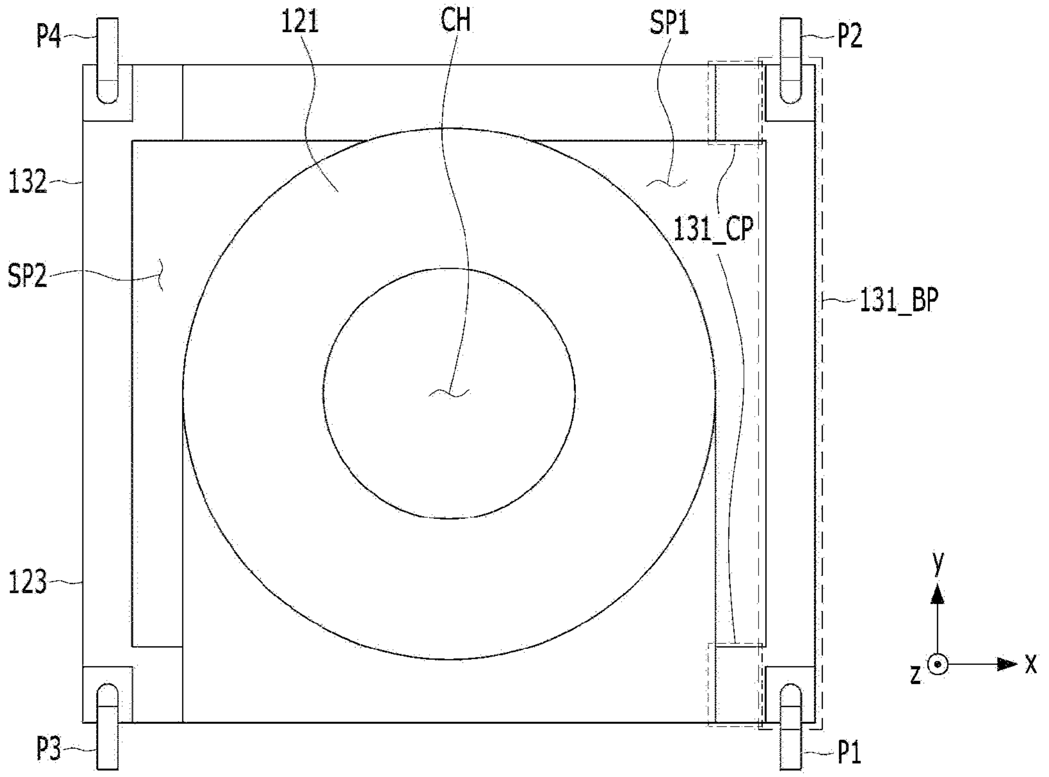
【FIG. 7】
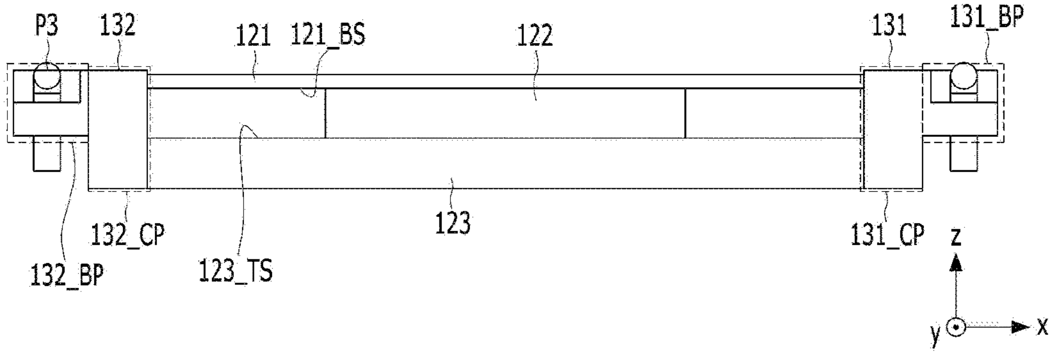

【FIG. 8】
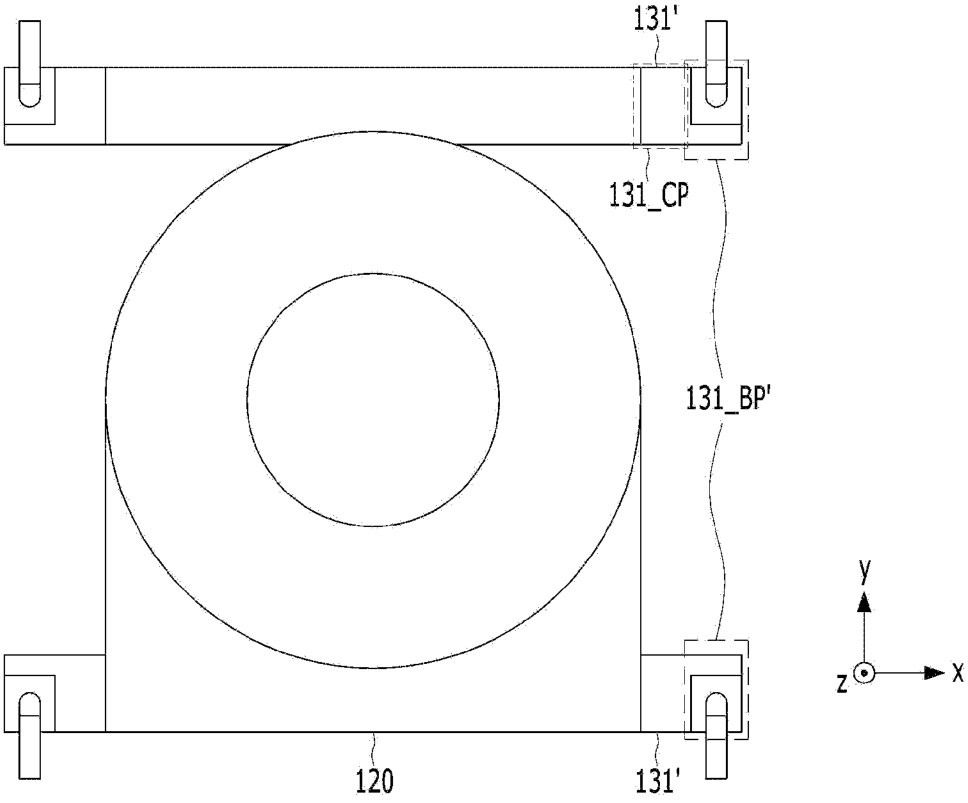

【FIG. 9A】
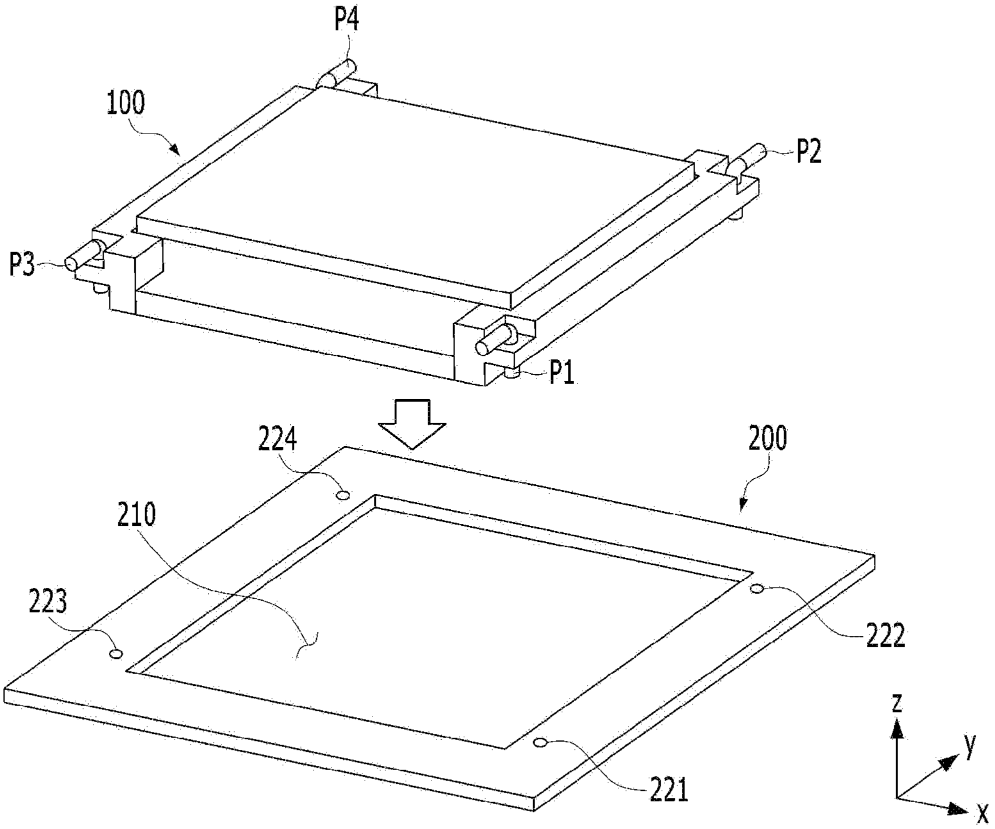

【FIG. 9B】
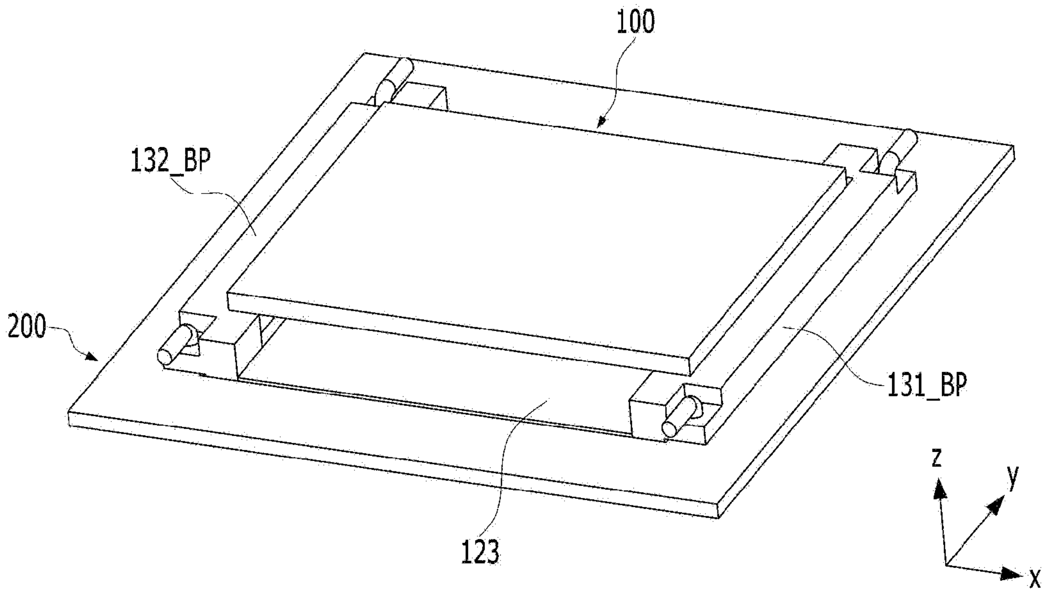
【FIG. 9C】
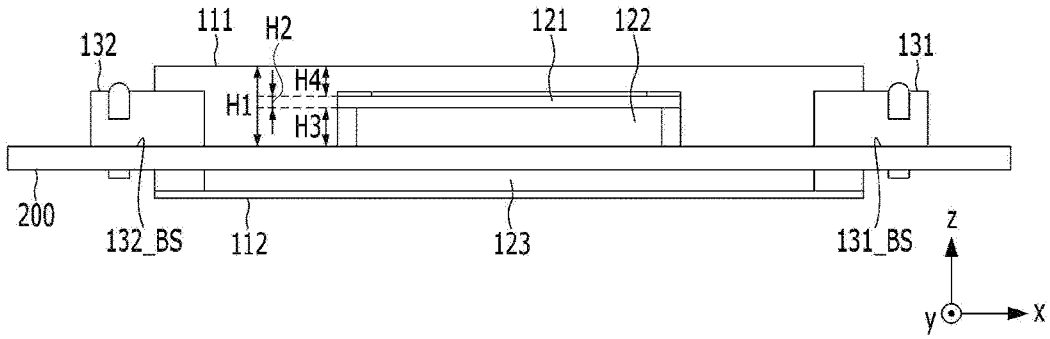

MAGNETIC ELEMENT AND FLAT PANEL DISPLAY DEVICE COMPRISING SAME

CROSS-REFERENCE TO RELATED PATENT APPLICATIONS

This application is a U.S. National Stage Application under 35 U.S.C. § 371 of PCT Application No. PCT/KR2020/006682, filed May 22, 2020, which claims priority to Korean Patent Application No. 10-2019-0066791, filed Jun. 5, 2019, whose entire disclosures are hereby incorporated by reference.

TECHNICAL FIELD

Embodiments relate to a magnetic element, and a circuit board and a flat panel display device including the same.

BACKGROUND ART

Generally, to drive an electronic device, driving power is needed, and a power supply (e.g., a power module) is essentially employed to supply such driving power to the electronic device. According to the recent trend of slimming electronic devices, slimming of passive magnetic elements constituting the power supply, such as an inductor, is also necessary.

However, when a coil is formed of a conductive wire, a bobbin is usually applied to such a passive magnetic element to maintain the shape of the coil and for ease of winding. A typical bobbin will be described with reference to FIGS. 1 to 2B.

FIG. 1 illustrates a typical bobbin.

Referring to FIG. 1, a perspective view of a bobbin 10 is illustrated at the upper side of the drawing, and a side view of the bobbin 10 is illustrated at the lower side of the drawing. As illustrated, the bobbin 10 includes a top part 11 and a bottom part 13, each of which is formed in an annular planar shape, and a middle part 12, which is disposed between the top part 11 and the bottom part 13 and is formed in a cylindrical shape. Here, a wire (not shown) forming a coil may be wound around the outer circumferential surface of the middle part 12. The reason why the typical bobbin 10 has such a shape will be described with reference to FIGS. 2A and 2B.

FIG. 2A illustrates an example in which a wire is wound around a bobbin not having a top part, and FIG. 2B illustrates an example in which a wire is wound around a typical bobbin.

Referring to FIG. 2A, upon winding a wire 20 on the outer circumferential surface of the middle part 12, when any one of the top part 11 and the bottom part 13 is omitted (in FIG. 2B, the top part is omitted), alignment of the wire 20 becomes unstable.

On the other hand, when the top part 11 and the bottom part 13 are both present, as illustrated in FIG. 2B, movement of the wire 20 is limited to the range between the lower surface of the top part 11 and the upper surface of the bottom part 13, which is suitable for maintaining winding alignment. In addition, the outer circumferential surface of the middle part 12 is open in a horizontal direction due to the top part 11 and the bottom part 13, each of which has the shape of a plate, which facilitates automatic winding using a machine.

As described above, when the top part 11 and the bottom part 13 are both present in the bobbin 10, and a side parallel to the outer circumferential surface of the middle part 12 is open, stable automatic winding is facilitated.

However, when the bobbin is provided with both the top part and the bottom part, it is disadvantageous for slimming. This will be described with reference to FIG. 3.

FIG. 3 illustrates an example in which a magnetic element provided with a typical bobbin is mounted on a substrate.

Referring to FIG. 3, there are illustrated the bobbin in FIGS. 1 and 2B, and the state in which a magnetic element including a magnetic core 30, surrounding the bobbin, is disposed on a substrate 40, having a hollow hole 41 therein. Specifically, the state illustrated in FIG. 3 may be such that the lower surface of the bottom part 13 is mounted on the upper surface of the substrate 40, so the bottom part 13 supports the magnetic element on the substrate 40.

In this case, the portion of the magnetic core that is positioned lower than the bottom part 13 of the bobbin is accommodated in the hollow hole 41 in the substrate 40, thereby allowing the height h4, by which the magnetic element protrudes from the upper surface of the substrate 40, to be lower than the height h5 of the magnetic core 30. However, assuming that the top part 11 and the bottom part 13 of the bobbin have the same thickness, the height h4 by which the magnetic element protrudes from the upper surface of the substrate 40 is the sum of the thickness h3 of an upper portion of the core 30, twice the thickness of the top part 11 (i.e., 2*h2), and the height h1 of the middle part. Here, it is difficult to change the thickness h3 of the upper portion of the core 30 and the height h1 of the middle part due to the design related to the desired performance of the magnetic element, and, as described above with reference to FIG. 2B, it is also undesirable to omit at least one of the top part 11 and the bottom part 13 for the sake of maintaining winding alignment. As a result, when a typical bobbin is applied, there is a limit to further reducing the height h4 by which the magnetic element protrudes from the upper surface of the substrate 40.

DISCLOSURE

Technical Problem

Embodiments provide a magnetic element and a flat panel display device including the same, which is improved with regard to ease of manufacture and safe seating of a substrate for slimming.

The technical problems to be solved by the present invention are not limited to the technical problems described above, and other technical problems not described herein may be clearly understood by those skilled in the art having ordinary knowledge from the description of the examples.

Technical Solution

In one embodiment, a magnetic element includes a coil-receiving unit, around which a wire forming a coil is wound and having therein a center hollow hole, a core provided with a center leg, which passes through the center hollow hole, and a first outer leg and a second outer leg, which are disposed at a periphery of the center leg and are configured to surround at least a portion of an outer side of the coil-receiving unit, a first support configured to surround at least a portion of an outer side surface of the first outer leg and to be coupled to one side of the coil-receiving unit, and a second support, configured to surround at least a portion of an outer surface of the second outer leg and to be coupled to the other side of the coil-receiving unit, the other side facing the one side, wherein each of the first support and the second support may include a support member, extending in a first direction and positioned at a height at which a lower surface thereof is positioned higher than a lower surface of the core.

The coil-receiving unit may include a top part, a bottom part, and a middle part disposed between the top part and the bottom part in a vertical direction and around an outer circumferential surface of which the wire is wound, wherein a lower surface of the top part may be parallel to an upper surface of the bottom part.

The height of the lower surface of the support member may be equal to or higher than the height of the upper surface of the bottom part.

At least a portion of the lower surface of the support member may be disposed on the upper surface of an external substrate, having therein a hollow hole.

The first support may further include connection parts, which are provided at opposite ends of the support member in the first support and extend in a second direction toward one side of the bottom part, the one side facing an inner side surface of the support member.

A planar shape of a first hollow hole, defined between the bottom part and an inner side surface of the first support, may correspond to a planar shape of the first outer leg.

Each of the first support and the second support may have through holes in opposite ends thereof.

The magnetic element may further include a pin disposed in each of the through holes.

One end of the pin may extend in a horizontal direction, and the other end of the pin may be bent and extend in a vertical direction.

In one embodiment, a circuit board includes a magnetic element, and a substrate having therein a hollow hole, into which at least a portion of the magnetic element is received, wherein the magnetic element may include a coil-receiving unit, around which a wire forming a coil is wound and having therein a center hollow hole, a core provided with a center leg, which passes through the center hollow hole, and a first outer leg and a second outer leg, disposed at a periphery of the center leg and configured to surround at least a portion of an outer side of the coil-receiving unit, a first support configured to surround at least a portion of an outer side surface of the first outer leg and to be coupled to one side of the coil-receiving unit, and a second support configured to surround at least a portion of an outer surface of the second outer leg and to be coupled to the other side of the coil-receiving unit, the other side facing the one side. Here, each of the first support and the second support may include a support member extending in a first direction and positioned at a height at which a lower surface thereof is positioned higher than a lower surface of the core, and at least a portion of the lower surface of the support member is disposed on the upper surface of the substrate.

Advantageous Effects

Embodiments provide a magnetic element and a flat panel display device including the same capable not only of securing ease of manufacture, but also of being stably fixed while adjusting a height from an upper portion of a substrate, by being provided with a bobbin, which includes a coil-receiving unit having an open side and a support unit configured to support the magnetic element on the substrate, which has therein a hollow hole.

The effects obtained by the present invention are not limited to the effects mentioned above, and other effects not mentioned above will be clearly understood by those skilled in the art based on the following description.

DESCRIPTION OF DRAWINGS

FIG. 1 illustrates a typical bobbin.

FIG. 2A illustrates an example in which a wire is wound around a bobbin not having a top part.

FIG. 2B illustrates an example in which a wire is wound around a typical bobbin.

FIG. 3 illustrates an example in which a magnetic element provided with a typical bobbin is mounted on a substrate.

FIG. 4 is a perspective view of an inductor according to one embodiment.

FIG. 5 is an exploded perspective view of the inductor according to one embodiment.

FIG. 6 is a planar view of a bobbin unit according to one embodiment.

FIG. 7 is a side view of the bobbin unit according to one embodiment.

FIG. 8 illustrates an example of the configuration of a bobbin unit according to another embodiment.

FIGS. 9A to 9C are views illustrating an example of a circuit board in which the inductor according to one embodiment is mounted on a substrate having therein a hollow hole.

BEST MODE

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents, and other embodiments that may be included within the spirit and scope of the present invention as defined by the appended claims.

It will be understood that although the terms "first", "second", etc. may be used herein to describe various elements, these elements should not be limited by these terms. These terms are generally only used to distinguish one element from another. For example, without departing from the scope of the present invention, a first component may be referred to as a second component, and similarly, the second component may also be referred to as the first component. The term "and/or" includes a combination of any or all of a plurality of related listed items.

It should be understood that, when an element is referred to as being "connected with" another element, there may be intervening elements present, or the element may be directly connected with the another element. In contrast, it should be understood that, when an element is referred to as being "directly connected with" another element, there are no intervening element present.

In the following description of the embodiments, it will be understood that, when an element such as a layer (film), region, pattern, or structure is referred to as being "on" or "under" another element, it can be "directly" on or under the other element, or can be "indirectly" disposed such that an intervening element is also present. In addition, it will also be understood that the criteria for "on" or "under" are determined on the basis of the drawings. In addition, since the thickness or size of each layer (film), region, pattern, or structure in the drawings may be changed for clarity and convenience of description, the dimensions of constituent elements may not accurately reflect the actual dimensions.

The terminology used herein is for the purpose of describing particular embodiments only, and is not intended to be limiting. A singular representation may include a plural representation unless the context clearly indicates otherwise. As used herein, the singular forms "a", "an", and "the" are intended to include the plural forms as well, unless the context clearly indicates otherwise. It will be further understood that the terms "comprise", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise defined, all terms including technical and scientific terms used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

A description will now be given in detail according to the exemplary embodiments disclosed herein, with reference to the accompanying drawings. For the sake of brevity of description with reference to the drawings, the same or equivalent components may be denoted by the same reference numbers, and a description thereof will not be repeated.

A magnetic element described below is assumed to be an inductor, but it will be apparent to those skilled in the art that it can be applied to a transformer when a middle part of a bobbin is divided to allow a secondary coil to be disposed thereon.

First, an inductor 100 according to one embodiment will be described with reference to FIGS. 4 and 5 together. FIG. 4 is a perspective view of an inductor according to one embodiment, and FIG. 5 is an exploded perspective view of the inductor according to one embodiment.

Referring to FIGS. 4 and 5 together, the inductor 100 according to one embodiment may include a core 110 and a bobbin unit 120, 130, P1, P2, P3, and P4.

The core 110, having the characteristic of a magnetic circuit, may serve as a passage for magnetic flux. The core 110 may have a form in which an upper core 111 and a lower core 112 are coupled to each other. In addition, the bobbin unit 120, 130, P1, P2, P3, and P4 may include a coil-receiving unit 120, on which a conductive wire (not shown) forming a coil is wound, a support unit 130, which supports the inductor 100 when the inductor 100 is seated on a substrate (not shown) having therein a hollow hole, and a plurality of pins P1, P2, P3, and P4, which penetrate the support unit 130 and the substrate (not shown) so as to fix the substrate (not shown) to the inductor 100, and electrically connect a circuit on the substrate (not shown) to the wire (not shown) forming the coil when connected to one end of the wire.

Hereinafter, each of the components will be described in more detail.

Cores 111 and 112 that constitute the core 110 may be symmetrical with each other in an up-down direction, or may be asymmetrical with each other. Assuming that the upper core 111 is vertically symmetrical with the lower core 112, the following description of the lower core 112 will replace the description of the upper core 111.

A lower surface of the lower core 112 may have a rectangular planar shape having a long side extending in one direction (e.g., the X-axis direction) and a short side extending in the other direction (e.g., the Y-axis direction) intersecting the one direction.

In addition, the lower core 112 may include a center leg (or a midfoot) 112_CL having a cylindrical shape, and outer legs 112_O1 and 112_O2 disposed at opposite sides facing each other around the center leg 112_CL. Here, a receiving hollow 112_R, defined in a cut-out track-type planar shape between inner side surfaces of the outer legs 112_O1 and 112_O2 and an outer circumferential surface of the center leg 112_CL so as to allow the lower core 112 to surround at least a part of the coil-receiving unit 120 of the bobbin unit, may correspond to the size and shape of the coil-receiving unit 120. The core having this shape is also referred to as an "EPC" core.

Meanwhile, the center leg 112_CL may be inserted into a center hollow hole CH in the coil-receiving unit 120. In addition, when the center leg 112_CL is coupled to the coil-receiving unit 120, a center leg (not shown) of the upper core 111 and the center leg 112_CL of the lower core 112 may be spaced apart from each other by a predetermined distance (e.g., 100 um) so as to form a gap therebetween, but not limited thereto.

According to another embodiment, any one of the upper core 111 and the lower core 112 may be an EPC-type core, and the other one may be a square-plate-shaped I-type core. According to still another embodiment, both the upper core 111 and the lower core 112 may be an E-shaped core. In this case, the coil-receiving unit 120 may have a shape that is laterally symmetrical with respect to an X-Z plane passing through a center of the center hollow hole CH.

The core 110 may contain a magnetic material. For example, the core 110 may contain Mn—Zn-based ferrite, and the magnetic permeability μ of the ferrite may be from 2,000 to 15,000, but is not necessarily limited thereto.

As described above, the bobbin unit 120, 130, P1, P2, P3, and P4 may include the coil-receiving unit 120, the support unit 130, and the plurality of pins P1, P2, P3, and P4.

The support unit 130 may include a first support 131, and a second support 132, which is spaced apart from the first support 131 with the coil-receiving unit 120 being interposed therebetween. In other words, the first support 131 and the second support 132 may be disposed at opposite sides of the coil-receiving unit 120 and may have a shape symmetrical with each other with respect to the coil-receiving unit 120.

In addition, when the support unit 130 is coupled to the coil-receiving unit 120 to constitute the inductor 100, the inner side surface of the support unit 130 may surround at least a portion of outer side surfaces of the outer legs of the core 110.

For example, the coil-receiving unit 120 and each of the supports 131 and 132 may be coupled to one another in a fitting manner using protrusions 120_P and receiving grooves 131_H, but it will be apparent to those skilled in the art that this is exemplary and not necessarily limiting, and various fastening manners may be applied. However, before the coil-receiving unit 120 and the support unit 130 are coupled to each other, the wire forming the coil may be first wound around the coil-receiving unit 120. The reason therefor will be described later in more detail with reference to FIGS. 6 and 7.

The pins P1, P2, P3, and P4 may be inserted into through holes TH formed in opposite ends of each of the supports 131 and 132. One end of each of the pins may extend in a horizontal direction, and the other end may be bent and extend in a vertical direction. The other end extending in the vertical direction may pass through both a through hole TH in each of the supports 131 and 132, and a through hole (e.g., 221, 222, 223, and 224 in FIG. 9A) in the substrate so as to be soldered to the lower surface of the substrate. In addition, the one end extending in the horizontal direction may be electrically connected to the wire (not shown) forming the coil. In this case, the pin connected to the wire may perform a function of fixing the inductor 100 and the substrate (not shown) to each other and also a function of electrically connecting the coil to the circuit on the substrate.

Hereinafter, the bobbin unit will be described in more detail with reference to FIGS. 6 and 7.

FIG. 6 is a planar view of the bobbin unit according to one embodiment, and FIG. 7 is a side view of the bobbin unit according to one embodiment.

Referring to FIGS. 6 and 7 together, the coil-receiving unit 120 may include a top part 121, a middle part 122, and a bottom part 123. The top part 121 may have an annular planar shape defined in a plate shape. The middle part 122 may have a cylindrical shape, and may be disposed between the top part 121 and the bottom part 123. The inner circumferential surface of the middle part 122 may define a center hollow hole CH in the coil-receiving unit 120, and a wire (not shown) forming a coil may be wound around the outer circumferential surface of the middle part 122.

The bottom part 123 may have a rectangular planar shape overall, and may have a through hole formed in a central portion thereof, which corresponds to the center hollow hole CH, and a recess, which corresponds to the shape of the outer leg of the core 110. In addition, an upper surface 123_TS of the bottom part 123 may form a plane parallel to the lower surface of the top part 121. That is, before the coil-receiving unit 120 is coupled to the support unit 130, a side portion of the coil-receiving unit 120 that is parallel to an outer circumferential surface of the middle part 122 is open in all directions. Therefore, the coil-receiving unit 120 may be coupled to the support unit 130 after winding of the wire (not shown) around the coil-receiving unit 120 is completed. Moreover, in this state, automatic winding of a wire (not shown) using a machine is possible regardless of the shape of the support unit 130 (that is, a state in which at least a portion of the side parallel to the outer circumferential surface of the middle part 122 is covered by the support unit due to the coupling with the support unit), thereby assuring excellent ease of winding.

Meanwhile, the first support 131 and the second support 132 constituting the support unit 130 may be coupled to the bottom part 123 of the coil-receiving unit 120. Specifically, the first support 131 and the second support 132 may be respectively coupled to opposite side surfaces of the bottom part 123, the opposite side surfaces parallel to a short axis (i.e., Y-axis) of the core 110 and facing each other.

Assuming that each of the first support 131 and the second support 132 has a shape that is laterally symmetrical with respect to the Y-Z plane passing through the center of the center hollow hole CH, the first support 131 will be described as an example.

The first support 131 may include a support member 131_BP extending in the short-axis direction (i.e., the Y-axis direction) of the core 110, and two connection parts 131 _CP, each provided at each of opposite ends of the support member 131_BP and extending toward one side of the bottom part 123, the one side facing an inner side surface of the support member 131_BP.

In a plane, a first hollow hole SP1, defined between the bottom part 123 and the inner side surface of the first support 131 in the state in which the bottom part 123 and the first support 131 are coupled to each other, may correspond to the planar shape of the outer leg at one side of the core 110. Similarly, a second hollow hole SP2, defined between the bottom part 123 and the inner side surface of the second support 132 in the state in which the bottom part 123 and the second support 132 are coupled to each other, may correspond to the planar shape of the outer leg at the other side of the core 110. Accordingly, in constituting the inductor 100, the inner side surface of each of the supports 131 and 132 may have a shape surrounding at least a portion of an outer side surface of any one of the two outer legs of the core 110.

Meanwhile, when the inductor 100 according to the embodiment is seated on a substrate, having therein a hollow hole, to constitute a circuit board (e.g., a circuit board embedded in a flat panel display device), the lower surface of the support member 131_BP or 132_BP may at least partially vertically overlap inner edges of the substrate, which define the hollow hole in the substrate. For example, the lower surfaces of the support members 131_BP and 132_BP may come into contact with upper surfaces of the inner edges of the substrate to support the inductor 100 on the substrate. To this end, the lower surfaces of the support members 131_BP and 132_BP may be positioned higher than the lower surface of the core 110, and more preferably, the lower surfaces of the support members 131_BP and 132_BP may be positioned at a height equal to or higher than the height of the upper surface of the bottom part 123.

Accordingly, the height by which the inductor 100 protrudes from the substrate can be changed by adjusting the height of the lower surfaces of the support members 131_BP and 132_BP. In other words, simply by coupling the support unit 130 provided with the support member, in which the height of the lower surface of the support member is changed, to the same coil-receiving unit 120, the height of the inductor 100 protruding from the substrate can be variously adjusted. Therefore, freedom in the design of the magnetic element, which faces limitations as to the height thereof above the substrate, is improved. This advantage will be described later in more detail with reference to FIGS. 9A to 9C.

In the embodiment described so far, the support coupled to one side of the coil-receiving unit 120, for example, the first support 131, has a one-piece structure, in which two connection parts 131_CP extend from opposite ends of one support member 131_BP. Alternatively, according to another embodiment, a support member may be provided for each connection part. This will be described with reference to FIG. 8.

FIG. 8 illustrates an example of the configuration of a bobbin unit according to another embodiment.

Referring to FIG. 8, in the bobbin unit according to another embodiment, a support 131' coupled to one side of the coil-receiving unit 120 may include two connection parts 131_CP spaced apart from each other, and two support members 131_BP' extending outwardly in a long-axis direction (i.e., X-axis direction) of the core (not shown) from each of the two connection parts 131_CP. In this case, the outer side surface of each of two outer legs of the core (not shown) is open to the outside, rather than being surrounded by the support member 131_BP', thereby having better heat dissipation performance.

Next, a form in which an inductor 100 according to one embodiment is mounted on a substrate and effects thereof will be described with reference to FIGS. 9A to 9C.

FIGS. 9A to 9C are views illustrating an example of a circuit board in which the inductor according to one embodiment is mounted on a substrate having therein a hollow hole.

First, referring to FIG. 9A, there are illustrated the inductor 100 according to one embodiment and a substrate 200 having therein a hollow hole 210 and a plurality of through holes 221, 222, 223, and 224 formed around the hollow hole 210. Here, the position of each of the through holes 221, 222, 223, and 224 may be aligned with the position of a vertically extending end of a corresponding one of the pins P1, P2, P3, and P4 provided in the inductor 100. In addition, the hollow hole 210 in the substrate 200 may at least vertically overlap the coil-receiving unit 120, the connection parts 131_CP and 132_CP of the supports 131 and 132, and the core 110. However, the hollow hole 210 may not overlap at least a portion of the support members 131_BP and 132_BP of the supports 131 and 132.

FIG. 9B illustrates the state in which the inductor 100 is seated on the substrate 200, with each of the vertically extending ends of the pins P1, P2, P3, and P4 provided in the inductor 100 passing through a corresponding one of the through holes 221, 222, 223, and 224. Specifically, a portion of the first support 131 that does not vertically overlap the hollow hole 210 in the substrate 200, that is, at least a portion of the lower surface of the support member 131_BP, may support the inductor 100 on the upper surfaces of the inner edges of the substrate 200, the inner edges defining the hollow hole 210. Similarly, a portion of the second support 132 that does not vertically overlap the hollow hole 210 in the substrate 200, that is, at least a portion of the lower surface of the support member 132_BP, may support the inductor 100 on the upper surfaces of the inner edges of the substrate 200, the inner edges defining the hollow hole 210. Here, when the height of each of lower surfaces 131_BS and 132_BS of the support members of the supports 131 and 132 is equal to or higher than the height of the upper surface of the bottom part 123 of the coil-receiving unit 120, as illustrated in FIG. 9C, the height of the upper surface of the bottom part 123 is equal to or lower than the height of the upper surface of the substrate 200. Accordingly, at least the thickness of the bottom portion 123 may always be excluded from the height H1 by which the inductor 100 protrudes from the upper surface of the substrate 200. In more detail, the height H1 by which the inductor 100 protrudes from the upper surface of the substrate 200 is comprised of the thickness H2 of the top part 121, the thickness H3 of the middle part 122, and the thickness of an upper portion of the upper core 111.

As a result, in the inductor 100 according to the embodiment, when the height of each of the lower surfaces 131_BS and 132_BS of the support members of the supports 131 and 132 is equal to or higher than the height of the upper surface of the bottom part 123 of the coil-receiving unit 120, the height by which the inductor protrudes from the substrate can be reduced by at least the height h2 of the bottom part 13 under the same conditions, compared to the case of the magnetic element having the typical bobbin 10 illustrated in FIG. 3, which is advantageous for slimming.

In addition, even if the side parallel to the outer circumferential surface of the middle part 122 is covered by the support unit 130, which is coupled to the bobbin unit to constitute the inductor 100, the side of the coil-receiving unit 120 parallel to the outer circumferential surface of the middle part 122 is open in all directions before the support unit 130 is coupled to the bobbin unit. For this reason, automatic winding using a machine is possible, thereby assuring ease of winding.

The description of each of the above-described embodiments may be applied to other embodiments, as long as there is no conflict between the content thereof.

Although the foregoing description has been given with reference to the embodiments, these are merely illustrative and do not limit the present disclosure, and it will be understood that those skilled in the art will be able to variously modify and change the present disclosure without departing from the essential characteristics of the embodiments. For example, each component specifically shown in the embodiments can be modified. Moreover, differences related to such modifications and applications should be construed as being included in the scope of the present disclosure defined in the appended claims.

The invention claimed is:

1. A magnetic element comprising:

a coil-receiving unit, around which a wire forming a coil is wound and having therein a center hollow hole;

a core provided with a center leg, which passes through the center hollow hole, and a first outer leg and a second outer leg, disposed at a periphery of the center leg and configured to surround at least a portion of an outer side of the coil-receiving unit;

a first support configured to surround at least a portion of an outer side surface of the first outer leg and to be coupled to one side of the coil-receiving unit; and a second support configured to surround at least a portion of an outer surface of the second outer leg and to be coupled to a remaining side of the coil-receiving unit, the remaining side facing the one side, wherein each of the first support and the second support comprises:

a support member, extending in a first direction and positioned at a height at which a lower surface thereof is positioned higher than a lower surface of the core.

2. The magnetic element according to claim 1, wherein the coil- receiving unit comprises:

a top part;

a bottom part; and a middle part, disposed between the top part and the bottom part in a vertical direction and around an outer circumferential surface of which the wire is wound, and wherein a lower surface of the top part is parallel to an upper surface of the bottom part.

3. The magnetic element according to claim 2, wherein a height of the lower surface of the support member is equal to or higher than a height of the upper surface of the bottom part.

4. The magnetic element according to claim 3, wherein at least a portion of the lower surface of the support member is disposed on an upper surface of an external substrate, having therein a hollow hole.

5. The magnetic element according to claim 2, wherein the first support further comprises connection parts, which are provided at opposite ends of the support member in the first support and extend in a second direction toward one side of the bottom part, the one side facing an inner side surface of the support member.

6. The magnetic element according to claim 2, wherein a planar shape of a first hollow hole, defined between the bottom part and an inner side surface of the first support, corresponds to a planar shape of the first outer leg.

7. The magnetic element according to claim 1, wherein each of the first support and the second support has through holes in opposite ends thereof.

8. The magnetic element according to claim 7, further comprising a pin disposed in each of the through holes.

9. The magnetic element according to claim 8, wherein one end of the pin extends in a horizontal direction, and a remaining end of the pin is bent and extends in a vertical direction.

* * * * *